United States Patent [19]

Hacker et al.

[11] 4,243,723
[45] Jan. 6, 1981

[54] AGENT FOR THE SURFACE TREATMENT OF FLAT INSULATING MATERIALS

[75] Inventors: Heinz Hacker, Nuremberg; Ernst Helwig, Bad Neustadt, both of Fed. Rep. of Germany

[73] Assignee: Siemens Aktiengesellschaft, Berlin and Munich, Fed. Rep. of Germany

[21] Appl. No.: 818,855

[22] Filed: Jul. 25, 1977

[30] Foreign Application Priority Data

Aug. 2, 1976 [DE] Fed. Rep. of Germany ....... 2634664

[51] Int. Cl.³ .................... B32B 27/06; B32B 27/34
[52] U.S. Cl. .................... 428/474.4; 427/58; 428/480
[58] Field of Search ............ 428/425, 474, 480, 475.2, 428/476.3, 474.7

[56] References Cited

U.S. PATENT DOCUMENTS

| | | | |
|---|---|---|---|
| 3,803,075 | 4/1974 | Kray et al. | 428/474 X |
| 3,974,314 | 8/1976 | Fuchs | 428/475.5 X |

FOREIGN PATENT DOCUMENTS 4624791 7/1971 Japan ...................................... 428/474.7

*Primary Examiner*—Thomas J. Herbert, Jr.
*Attorney, Agent, or Firm*—Kenyon & Kenyon

[57] ABSTRACT

The invention relates to agents for the surface treatment of flat insulating materials having a base of aromatic polyamides, and to a method for improving the surface characteristics of such flat insulating materials. According to the invention, such agents have the structure

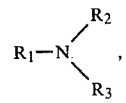

where at least one of the radicals $R_1$ to $R_3$ has a reactive group which can be incorporated into an impregnating resin system. Advantageously at least one of the radicals $R_1$ to $R_3$ has a reactive hydrogen atom or has an ethylenic or acetylenic unsaturated grouping.

7 Claims, No Drawings

AGENT FOR THE SURFACE TREATMENT OF FLAT INSULATING MATERIALS

BACKGROUND OF THE INVENTION

The invention relates to agents for the surface treatment of flat insulating materials having a base of aromatic polyamides.

Flat insulating materials serve as insulating materials in highly stressed electric machines, for example, as cover slides for stator and armature slots. Such flat insulating materials must exhibit good electrical, thermal and mechanical properties, and therefore, they generally consist of aromatic polyamides or a combination of aromatic polyamides with other insulating materials, for example, with a polyester base. Of great significance are, for example, aromatic polyamides of m- or p-phenylene diamine and terephthalic acid.

In utilizing aromatic polyamides as flat insulating materials, the poor bond between the polyamide surface and the impregnating resins applied thereon is disadvantageous. Cover slides for stator and armature slots, for example, must accordingly have small manufacturing tolerances so that sufficient strength can be obtained. In the assembly, where the outside of the cover slides glides the walls of the slot insulation and at the same time, the winding inserted into the slot pushes the cover slide hard upward, the force required is very large due to the large friction forces that occur. In addition, this large force often leads to trouble in the production cycle due to jamming and breakage and to increased manufacturing costs.

The reason for the poor workability is that the flat insulating materials used, for example, the cover slides of aromatic polyamide, have a rough surface structure, which is particularly the case with fabrics and with paper pressed from fibers. It has been attempted, therefore, to avoid the above-mentioned difficulties through the use of lubricants. For this purpose, the surfaces of the flat insulating materials are treated with silicone or paraffin oil. Although this makes possible the insertion of the cover slides into the stator or armature slots without excessive effort, the adhesion between the flat insulating material and the subsequently applied impregnating resin is further reduced by this measure. Indeed, silicone oils cause a complete separation between the impregnating resin and the surface of the flat insulating material.

SUMMARY OF THE INVENTION

It is accordingly an object of this invention to describe an agent for the surface treatment of flat insulating materials having a base of aromatic polyamides which improves the bond between the flat insulating material and an impregnating resin and permits working with larger tolerances.

According to the invention, this is achieved by an agent which has the following structure

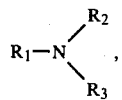

wherein at least one of the radicals $R_1$ to $R_3$ has a reactive group which can be incorporated into an impregnating resin system.

Nitrogen compounds of this type act like a primer. Through their use, a firm bond between the flat insulating material and the impregnating resin is achieved. In this manner, one can work, for example, in the assembly of cover slides in stator and armature slots of electric machines, with relatively large tolerances, whereby difficulties such as jamming and breakage, which interfere with the manufacturing cycle, are also avoided. The firm bond between the impregnating resin and the aromatic polyamide is based, on the one hand, on the chemical incorporation of the nitrogen compound into the impregnating resin matrix and, on the other hand, on a presumed interaction similar to an electrostatic block between the acid amide groupings of the polyamide and the nitrogen atoms of the nitrogen treatment agent.

DETAILED DESCRIPTION OF THE INVENTION

For the system polyamide/UP (unsaturated polyester)-resin, i.e., where an unsaturated polyester resin is utilized as the impregnating resin, the agents according to the invention for the surface treatment of flat insulating materials advantageously contain ethylenically or acetylenically unsaturated groups. For the systems polyamide/EP (epoxy)-resin and polyamide/PUR (polyurethane)-resin, nitrogen compounds with reactive hydrogen atoms are advantageously employed. In the case of impregnating resins with a polyurethane base, these may be acidic hydrogen atoms in the form of $NH_2$ or $OH$ groups, and in the case of epoxy resins, in the form of $NH_2$ or $COOH$ groups. In particular, one of the radicals $R_1$ to to $R_3$ at the nitrogen atom can be a hydrogen atom.

It is particularly advantageous if one of the radicals $R_1$, $R_2$ and $R_3$ of the nitrogen compound is a branched or unbranched alkyl radical with 6 to 24 carbon atoms, and preferably, having 14 to 20 carbon atoms. Such compounds have an oily, fatty or soap-like consistency at room temperature and are able to smooth the surface of the flat insulating material of polyamide. Thereby, the friction forces, for example, in the assembly of cover slides, are greatly reduced and their assembly presents even fewer problems.

In the agents for the surface treatment of flat insulating materials according to the invention, one of the radicals $R_1$ to $R_3$ is preferably a branched or unbranched alkyl radical with 14 to 20 carbon atoms and the second radical a hydrogen atom, while the third radical is the carrier of the group required for the incorporation into the impregnating resin matrix. Such compounds are preferably 2,4-dienoxy-6-aminoalkyl-s-triazines, particularly 2,4-diallyloxy-6-aminostearyl-s-triazine, N-alkyl-acrylic acid amides or N-alkyl-methacrylic acid amides and N-alkyl allylamines. Other derivatives of cyanur-acid monoamides are also well suited, such as 2,4-dimethallyloxy-6- aminostearyl-s-triazine, 2,4-diethallyloxy-6-aminostearyl-s-triazine, 2,4-dimethallyloxy-6aminolauryl-s-triazine, 2,4-diethallyloxy-6-aminolauryl-s-triazine, 2,4-dicrotyloxy- 6-aminolauryl-s-triazine and 2,4-dicrotyloxy-6- aminostearyl-s-triazine. Also in the acrylic-acid amides and the allylamines, the stearyl and the lauryl groups serve preferably as the alkyl radicals. Of course, mixtures of these compounds can also be used for the surface treatment of flat insulating materials.

The flat insulating materials are generally coated with the agents for the surface treatment according to the invention in such a manner that a solution of the nitrogen compound is applied by brushing, spraying or immersion, and the solvent is subsequently removed. In the case of 2,4-dienoxy-6-aminoalkyl-s-triazines, for example, one may use a 3% solution in toluene or in a mixture of toluene and test gasoline.

The improvements obtainable through the use of the agents for the surface treatment of flat insulating materials according to this invention will be explained in further detail with reference to the test results which follow.

Tensile-shear strength tests on test strips of an aromatic polyamide, for example, Nomex (Nomex ® is the trade name for an aromatic polyamide of m-phenylene diamine and terephthalic acid manufactured by the DuPont deNemours Co.) showed that in flat insulating materials treated with agents according to the invention, such as 2,4-diallyloxy-6-aminostearyl-s-triazines, the force required for tearing is increased as compared with untreated samples, i.e., the tensile shear strength of the sample strips treated with the agents according to the invention is distinctly higher. In these investigations, pretreated and untreated sample strips having a width of 15 mm were used, which, overlapping on one side over a length of 3 cm, were cemented together with an impregnating resin, for example, an unsaturated polyester resin.

Measurements of the tensile shear strength on Nomex strips cemented together with one-sided overlap showed the following results:

(a) Nomex as received, i.e., without the agent according to the invention, 1.13 N/mm$^2$;

(b) Nomex, coated with the agent according to the invention, and specifically with 2,4-diallyloxy-6-aminostearyl-s-triazine, 1.31 N/mm$^2$;

(c) Nomex with a roughened surface, without the agent according to the invention, 0.93 N/mm$^2$.

These measurement results, each of which represents the average of 20 individual measurements, show that the improvement of the adhesion of flat insulating material of Nomex treated with the agent according to the invention is about 16% over that of the untreated samples. In comparison with untreated samples having a roughened surface, one obtains an improvement of the adhesion by about 41%.

The additional effect of smoothing the polyamide surfaces, which is important from a manufacturing point of view and occurs if nitrogen compounds with a soap-like consistency are used, can be determined by means of sliding ability measurements in accordance with DIN 53 375 ("Determination of the Friction Behavior"). Here, the friction coefficient $\mu$ is determined from the values of the tension force $F_Z$ and the pressure force $F_A$ from $\mu = F_Z/F_A$. The sliding ability measurements were made with the system Nomex/Nomex.

On a fixed support of Nomex, a loose Nomex disk with a thickness of 0.51 mm and a diameter of 50 mm was placed and loaded with a weight of 8 N (diameter of the weight: 50 mm). The loaded Nomex disk was then pulled, with the interposition of a spring scale, over the fixed Nomex support with a velocity of 3 to 5 cm/sec. The following friction coefficients were determined:

(a) Nomex without surface treatment: $\mu = 0.14$ to $0.15$;

(b) Nomex disk treated with 2,4-diallyloxy-6-aminostearyl-s-triazine, Nomex support untreated: $\mu = 0.12$ to $0.13$;

(c) Nomex disk and Nomex support treated with 2,4-diallyloxy-6-aminostearyl-s-triazine: $\mu = 0.105$ to $0.115$.

Upon repeating the test several times and with slight polishing of the surface-treated Nomex samples, it was possible to reduce the friction coefficient to as low 0.08. This is a considerable decrease as compared to the initial value of the friction coefficient, at which the cover slides of Nomex can hardly be pushed into Nomex-lined slots without breaking.

What is claimed is:

1. A method for improving the bonding between an impregnating resin and a flat insulating material having a base comprised of an aromatic polyamide, said method comprising treating said insulating material with a compound of the structure

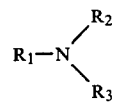

wherein the radical $R_1$ contains a reactive group which chemically incorporates into the impregnating resin, said group being selected from the group consisting of a reactive hydrogen atom and an ethylenically or acetylenically unsaturated grouping; and wherein the radicals $R_2$ and $R_3$ are selected from the group consisting of a hydrogen atom and alkyl radicals having 6 to 24 carbon atoms, with the proviso that $R_2$ and $R_3$ are not both hydrogen atoms.

2. The method according to claim 1 wherein one of the radicals $R_2$ and $R_3$ is an alkyl radical having 6 to 24 carbon atoms.

3. The method according to claim 2 wherein said compound is an N-alkyl acrylic acid amide.

4. The method according to claim 2 wherein said compound is an N-alkyl methacrylic acid amide.

5. The method according to claim 2 wherein said compound is an N-alkyl allylamine.

6. The method according to claim 2 wherein said compound is a 2,4-dienoxy-6-aminoalkyl-s-triazine.

7. The method according to claim 6 wherein said compound is 2,4-diallyloxy-6-aminostearyl-s-triazine.

* * * * *